Dec. 7, 1937.  R. G. AREY ET AL  2,101,665
SYNCHRONOUS MOTOR
Filed Nov. 19, 1935

PERMANENT MAGNET, LIGHT WEIGHT INSULATING MATERIAL.

Inventors:
Ralph G. Arey,
Harold T. Faus,
by Harry E. Dunham
Their Attorney.

Patented Dec. 7, 1937

2,101,665

UNITED STATES PATENT OFFICE 2,101,665

SYNCHRONOUS MOTOR

Ralph G. Arey, Swampscott, and Harold T. Faus, Lynn, Mass., assignors to General Electric Company, a corporation of New York Application November 19, 1935, Serial No. 50,508

6 Claims. (Cl. 172—278)

Our invention relates primarily to synchronous motors and its object is to provide a simple self-starting synchronous motor having exceptionally high useful synchronous torque. It relates also to polarized rotor elements for dynamo-electric machines generally.

In carrying our invention into effect, as applied to synchronous motors, we preferably employ a simple alternating-current magnetic field stator, and employ a polarized rotor made of a nonconductor whereby damping torque therein is eliminated. By eliminating such damping torque in this form of motor, we are able to greatly increase the useful synchronous torque of the motor and to make a synchronous motor which is self-starting even in a simple alternating flux field having no rotating or shifting component. We furthermore prefer to use a material in the rotor which is unusually light in weight whereby the inertia load at starting is diminished to a negligible value and the motor starts and reaches synchronous speed substantially instantaneously. We furthermore prefer to use a rotor material and a rotor having, in addition to the above characteristics and functions, one which gives an efficient permanent magnet of unusually short length compared to its cross-section and in which the line of polarization is very definite and fixed, whereby it is, for all practicable purposes, impossible to magnetically balance the rotor in a simple alternating field having no rotating or shifting component so as to prevent the rotor from rotating in one direction or the other.

As a result of the combination of these characteristics and resulting functions, we have been able to produce a self-starting synchronous motor having a simple alternating-current stator without shading coils or the equivalent, which motor starts and pulls into synchronism substantially instantaneously and gives considerably greater useful synchronous torque for a given input than any prior motor of which we are aware approaching it in size and simplicity of construction.

The simple motor referred to above may start in either direction of rotation and, where it is desirable to provide a unidirectional rotating motor, we provide means to prevent rotation in one direction or we provide a field having a rotating component sufficient to produce rotation in only one direction.

Figure 1:
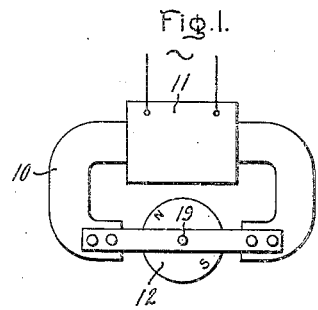
Figure 2:
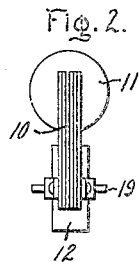
Figure 3:
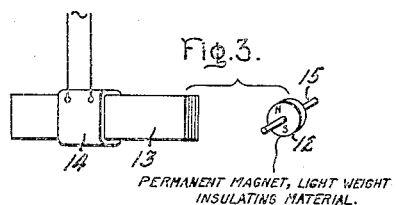
Figure 4:
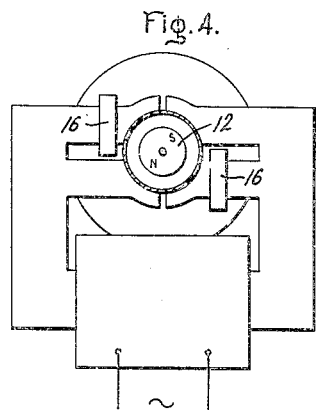
Figure 5:
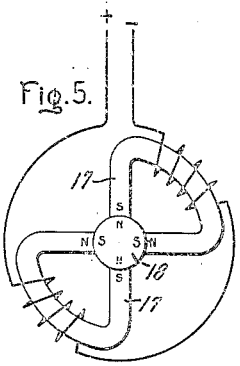
Figure 6:
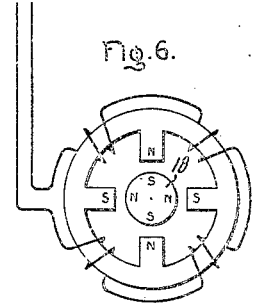
Figure 7:
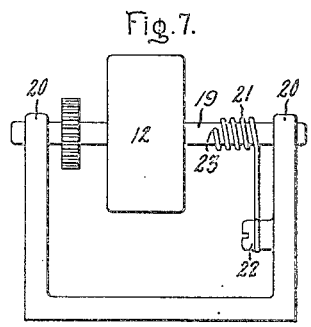
Figure 8:
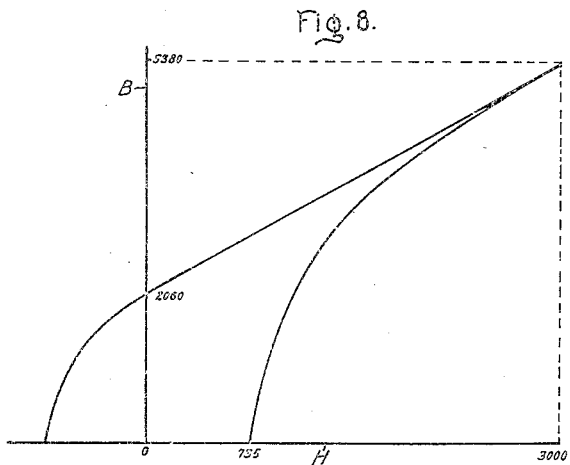

The features of our invention which are believed to be novel and patentable will be pointed out in the claims appended hereto. For a better understanding of our invention, reference is made in the following description to the accompanying drawing wherein Figs. 1 and 2 represent end and side views, respectively, of a two-pole self-starting synchronous motor embodying the present invention; Fig. 3 is a one-pole stator self-starting synchronous motor embodying the present invention; Fig. 4 represents a two-pole shaded-pole stator motor, the shading poles being used to determine the direction of rotation of the motor; Fig. 5 represents the manner of polarizing a sintered oxide rotor for four poles; Fig. 6 represents such a four-pole rotor mounted in a four-pole stator; Fig. 7 illustrates a mechanical expedient to prevent rotation of the rotor of my invention in one direction when placed in an alternating field having no rotating component; and Fig. 8 is a portion of the hysteresis curve typical of the material used in the rotor.

A simple form of our invention is represented in Figs. 1 and 2. The stator consists of the simplest form of bipolar alternating-current field comprising the core 10 and single-phase alternating-current exciting coil 11. The stator iron is preferably laminated. The rotor consists of a solid, unlaminated cylinder of insulating material which is also a magnetic material capable of being permanently magnetized and which is polarized across a diameter thereof. A material which we have used for the rotor with satisfactory results is prepared and magnetized as follows: Mix together finely powdered magnetite, ferric oxide and cobaltic oxide in the proportions of two molecules of magnetite, two molecules of ferric oxide and one molecule of cobaltic oxide. Mold the mixture in the shape desired under pressure of from three to five tons per square inch. Remove from mold and heat in an atmosphere of nitrogen for two or three hours at about 1050 degrees C. and allow to cool. Then reheat to about 520 degrees C. in a special furnace placed in the air gap of a direct current electromagnet with a field of about 3000 H. With the field on, lower the temperature to about 300 or 320 degrees C. and hold in the field within this range of temperature for about three-quarters of an hour. Then allow to cool in the field to below 100 degrees C. The material may then be machined or ground to shape, if necessary.

Such material after being magnetized, in addition to being a permanent magnet of exceptionally high coercive force and low residual induction, has other remarkable properties. It has a resistance between 600,000 and 1,000,000 ohms per cm. cube and is thus practically an insulator.

It is hard and of a gray slate color. It is very light in weight as compared to other magnetic materials, having a specific gravity of approximately one-half that of ordinary steel. The coercive force of the material prepared as previously described is between 700 and 1000 orsteads and has a residual induction of about 2000 lines per square centimeter, as indicated in Fig. 8.

The line of polarization is very definite and fixed and does not shift. The behavior of the cylindrical magnet in this respect is just as if it were a thin line permanent magnet. This material may be polarized after the heat treatment, but in such a case the resulting permanent magnet is not so strong.

We prefer to make the diameter of the rotor about twice its axial thickness as this appears to represent approximately the most efficient design of permanent magnet for the shape and material used. In order to give a clearer understanding of this statement, it may be said that the most efficient design of a cobalt steel bar magnet is one having a length to diameter of bar of about 8 to 1. Due to the higher coercive force and lower residual induction of the sintered oxide material used in my rotor, the most efficient design of a bar magnet made thereof is one where the length to diameter is about 2 to 1. It thus becomes evident that the solid cylindrical rotor of sintered oxide having a diameter about twice its axial thickness and polarized across a diameter thereof is an efficient permanent magnet which lends itself much more readily to a compact design with minimum leakage than would a rotor which cannot efficiently occupy but a small fraction of the space that must be provided between the stator pole pieces.

The cross-sectional area of the magnetic material in the flux path in the stator core need not be as great as the cross section of the permanent magnet rotor since the flux density that may be maintained without approaching saturation in the stator iron is considerably greater than that which can be obtained in the sintered oxide with a reasonable value of flux. Mechanical rather than magnetic considerations will generally govern the size of the stator core. While we do not limit our invention to any particular size of motor, it may be stated that our investigations have thus far been carried out with rotors less than one-half inch in diameter and that it is expected that the invention will be found most useful in small timing motors. We have found that with these small rotors, the air gap clearance between stator and rotor should be not less than about one-sixteenth inch if the motor is to be reliably self-starting in a relatively strong shaded pole field. Observations thus far made seem to indicate that such a rotor will start more readily in a nonshaded pole field than in a shaded pole field.

When such a rotor is placed in the stator of Fig. 1 and the field energized by alternating current, the rotor apparently immediately jumps into synchronism and runs at synchronous speed in one direction of rotation or the other. We believe that there may be some oscillatory vibration of the rotor during starting which the eye is not quick enough to follow. Ordinarily, when a polarized rotor is placed in an alternating magnetic field having no rotating component, it will not start. It may vibrate slightly but very definitely lock in a standstill position. The remarkably different behavior of the motor of our invention in this respect is apparently due to several factors.

1. The rotor is practically an insulator, consequently, it has no eddy currents set up therein and consequently, there is no damping torque resisting rotation. Laminating of this material is entirely unnecessary to prevent the eddy current losses therein.

2. The rotor is much lighter in weight than would be a steel rotor of the same dimensions so that the inertia to quick starting is very much less.

3. The permanent polar strength is several times that possible to obtain in a polarized steel rotor of the same dimensions and, consequently, the torque tending to turn so as to align the rotor with the stator field is correspondingly greater.

4. The line of polarization in the new rotor is definite and fixed and apparently cannot be shifted whereas, in a polarized steel rotor, it is apparently possible to shift the line of polarization; that is, it is possible to demagnetize a polarized steel rotor and polarize it along a slightly different axis. It is apparently impossible to so balance the polarized rotor of my invention at rest in an alternating field that it will not turn in one direction or the other and align itself with the field as it shifts in polarity. After having once started in a given direction, its inertia at synchronous speed is sufficient to thereafter determine its direction of rotation and maintain the same.

As a result of these characteristics, low inertia, zero lamping torque, high pull in torque, and instability at standstill in an alternating field, the motor is definitely self-starting although, unless otherwise prevented, it may start in either direction of rotation in a simple alternating field. The direction of rotation probably depends upon the position of the rotor and the polarity which the stator field poles first assume when the current is turned on. It is believed that the rotor, when disconnected from any load, reaches synchronous speed within the first few flux cycles.

We have found that such a rotor will start and operate synchronously in practically any form of weak alternating-flux field. For example, Fig. 3 represents an operative motor. Here 13 is a straight core member made up of a few laminations surrounded by a single-phase exciting coil 14. The pole pieces extend away from each other in opposite directions. When the polarized rotor 12 of sintered oxide is mounted on a shaft 15 and brought within about two inches of one end of such core member, it will start and rotate synchronously with a vigorous torque.

It is, of course, possible to use such a rotor of polarized sintered oxide in a shaded pole field as represented in Fig. 4. In this modification, the motor is self-starting and synchronous in operation as before but also always starts in that direction of rotation determined by the direction of flux shift produced by the shading coils 16, as indicated by the arrow.

The stator shown in Fig. 4 represents that form of bipolar shaded pole stator used on the well known Warren self-starting synchronous clock motor. The Warren motor uses a hardened steel rotor which starts by hysteresis action. By way of comparison with the Warren motor, we may say that we have taken a standard Warren motor and replaced the rotor therein with our improved rotor of polarized sintered oxide and thereby have increased the synchronous running torque of the motor approximately six times.

The efficiency of our improved motor is considerably higher than that of previous clock motors. This is due to the total absence of eddy current in the rotor and due to the fact that a large part of the required motor excitation exists in the rotor as a permanent magnet.

Such a rotor may be made with a greater number of poles than two. For example, in Fig. 5, we have illustrated the manner of polarizing such a rotor so as to have four poles. The rotor is inserted between the pole pieces of direct-current electromagnets 17 arranged with polarities as indicated and a heavy direct current is sent through their windings while the rotor 18 of sintered oxide is hot and later allowed to cool, as described previously. The rotor is then strongly polarized with four poles of alternate polarity and may be used in a four-pole alternating-current field stator, as indicated in Fig. 6.

In Fig. 7, we have represented a simple expedient for assuring rotation of the motor in a given direction only, when employing a stator field member having no rotating field component. In Fig. 7, the polarized rotor 12 is fixed on a shaft 19, which shaft is mounted in suitable bearings 20. About shaft 19 is coiled a spring 21 having one end fixed at 22 to a stationary support and the other end 23 terminating in the end turn about the shaft but otherwise free. Now, if the spring is of the proper flexibility and lightly contacts with the shaft in the idle condition, it will tend to unwind when the shaft is turned in a counter-clockwise direction, as viewed from the right end thereof, and will wind up and grasp the shaft when the latter is turned in the opposite direction. If properly adjusted, the spring will, therefore, prevent any material rotation of the shaft in a clockwise direction but will allow it to turn freely in the opposite direction. Such a device applied to the motors of Figs. 1 and 6 will, therefore, assure their rotation in one direction only. If the rotor position and stator polarity are such that the rotor tends to start in the wrong direction, it is immediately checked and, on the next half cycle, the rotor will start and rotate in the correct direction. The direction of rotation permitted may be reversed by reversing the direction in which the spring is wrapped about the shaft. Other simple mechanical expedients for accomplishing the same purpose may be employed.

Owing to the fact that the rotor is polarized, it tends to align its magnetic poles with the pole pieces of the stator when the latter is de-energized. This, together with the very low inertia of the rotor, causes it to stop substantially instantaneously when de-energized.

While the motor above described is self-starting, its starting torque does not compare favorably with its very excellent torque at synchronous speed. It is contemplated that, where the motor is required to start any appreciable load, additional expedients may be used to facilitate starting and that the sintered oxide rotor herein described may be only one element of the complete rotor. It is the intention to have the appended claims cover the motor broadly with or without such additional starting features as may be found desirable in certain cases. Certain of the claims are also broad enough to cover a polarized sintered oxide rotor element for dynamo-electric machines generally. It is contemplated that such a rotor may be useful in magneto-generators, for example, and may also be used in other magnetic circuits of dynamo-electric machines in which the flux may vary and where it is desirable to reduce eddy current losses since this material has no eddy current losses even though unlaminated.

In accordance with the provisions of the patent statutes, we have described the principle of operation of our invention together with the apparatus which we now consider to represent the best embodiment thereof, but we desire to have it understood that the apparatus shown is only illustrative and that the invention may be carried out by other means.

What we claim as new and desire to secure by Letters Patent of the United States is:

1. A rotor element for synchronous motors comprising a permanent magnet made of sintered oxide which has a resistance above 500,000 ohms per cubic centimeter.

2. A rotor element for synchronous motors comprising a solid cylinder of sintered oxide permanently magnetized across a diameter thereof and having a diameter about twice its axial thickness.

3. A self-starting synchronous motor comprising means for producing an alternating flux field having no rotating or shifting component and a cylindrical rotor within the influence of said field, said rotor being polarized across a diameter thereof and made of a solid insulating material having a specific gravity of about one-half that of steel.

4. A self-starting synchronous motor comprising means for producing a bipolar alternating flux field, and a cylindrical rotor in said field which is permanently magnetized across a diameter thereof, said rotor being made of a sintered oxide insulating material having an axial thickness of approximately one-half of its diameter.

5. A self-starting synchronous motor comprising means for producing an alternating flux field, a nonsalient pole rotor within the influence of said field, said rotor comprising a pivoted permanent magnet sufficiently light in weight as compared to its tendency to align its magnetic poles with the alternating flux field as to always start rotating in one direction or the other from any rotary positions in said field and to rotate synchronously, and mechanical means for preventing its rotation in one direction.

6. A self-starting synchronous motor comprising a stationary electromagnet energized by single-phase alternating current and having projecting pole pieces extending away from each other in opposite directions, and a rotor consisting of a solid cylinder of sintered oxide insulating magnetic material, polarized across a diameter thereof, rotatably mounted opposite one of said projecting pole pieces.

RALPH G. AREY.
HAROLD T. FAUS.